July 28, 1959   J. R. LAWLOR   2,897,087
FOOD PACKAGE
Filed March 5, 1956
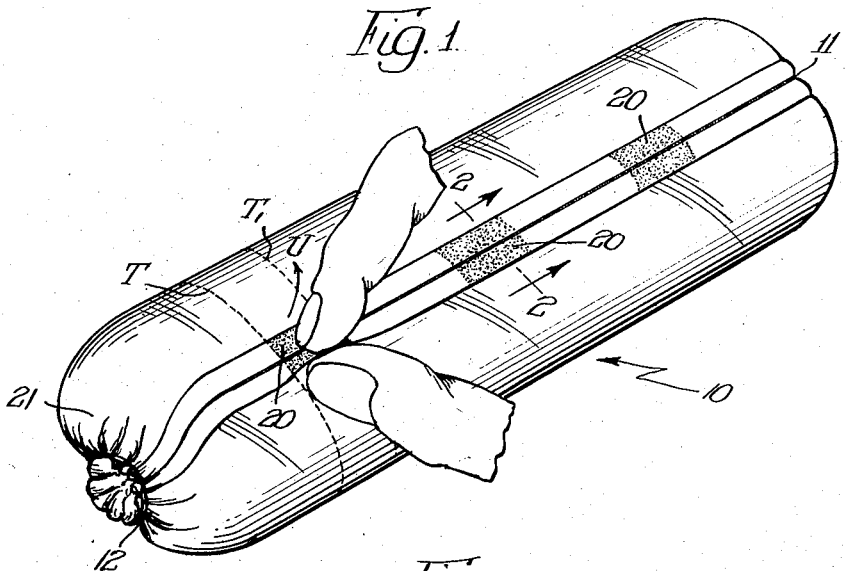
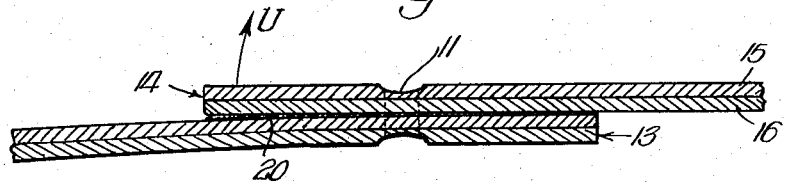
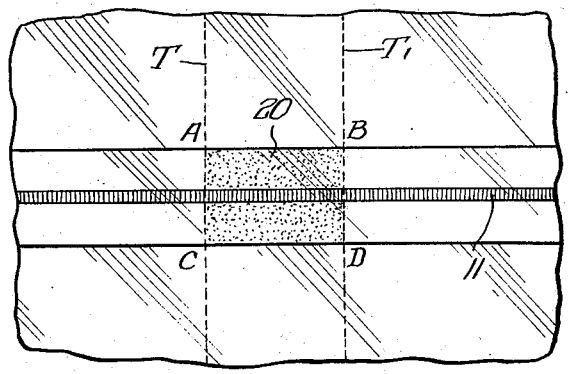
INVENTOR.
Joseph R. Lawlor,
BY

United States Patent Office 2,897,087
Patented July 28, 1959

2,897,087

FOOD PACKAGE

Joseph R. Lawlor, Western Springs, Ill., assignor to Tee-Pak, Inc., Chicago, Ill., a corporation of Illinois Application March 5, 1956, Serial No. 569,431

5 Claims. (Cl. 99—171)

The present invention relates to packaging materials, packages and improved means for disrupting a package made of film materials.

Recently, various film materials have been utilized as package forming media. As an example, films are frequently formed into flexible tubes for the packaging of food products such as cheese, ground meats, ice cream, frozen vegetables, etc. Such tubular packages normally constitute an extruded or fabricated tube which is closed over at its opposite ends after the introduction of the food product. Disrupting or opening of the package is generally carried on by cutting through the film with a knife blade or the like. The film material also may be disrupted in other ways as by breaking or tearing away the same from around the stored food articles or by providing a thread or string which may be pulled to tear the package as desired. The desirability of a built-in or self-contained disrupting means for a package of these characteristics is readily apparent as it greatly improves convenience of use.

To date, no genuinely successful built-in disrupting means for tubular packages made of transparent films, such as saran or other films of a similar nature has been presented.

It is to the provision of a disrupting means for packages made from transparent films of this character that the present invention relates.

One of the more difficult problems in providing a built-in or self-contained means for disrupting the transparent packaging films has been the inability to tear the tubular package transversely of its axis and at selected positions along its length other than by cutting through the film with a knife blade. Experience in disrupting a single film of saran, for example, has shown the tendency of such film to disrupt in uncontrollable directions and unevenly. That is to say, tearing a single layer tubular film of saran results in bias or diagonal splitting in an uneven and undesirable manner with little or no control over the direction of tear, thus resulting in the destruction of the package. Therefore the present invention is unworkable with single layer saran films.

Briefly, my present invention relates to new and improved packages made of transparent film materials, particularly saran and like film media and a means whereby I am able to disrupt a tubular package of the same intermediate its ends and/or at several preselected positions along the length thereof by simply pulling on a tab of the film material. Surprisingly, I have discovered that whereas a single film of such saran is prone to tear in an uncontrolled manner, a film made of at least two layers of this material may be torn evenly along a predetermined path if proper disrupting conditions are present. To accomplish this objective, I form a tube from the multi-layer plastic packaging material by overlapping and joining opposite edge portions of an elongated section thereof thereby producing a lengthwise seam. I find a thermal seal to be best adapted for joining such overlapped edge portions and I include means for weakening the bond or seal at selected areas. These weakened areas provide points for disrupting the package by removing encircling bands or sections thereof.

The main object of this invention is to provide a new, improved and more economical package container embodying a built-in or self-contained disrupting means.

Another object of this invention is to provide a new and improved package of film materials constructed and formed to permit the opening of a tubular package thereof along a line substantially transverse to its longitudinal axis and at various preselected points as required.

Still another object of this invention is to provide a new and improved tubular container or package constructed of multi-layer plastic films having a built-in means for disrupting said films to open the package according to a predetermined pattern.

A still further object of this invention is to provide a new and improved means for disrupting packages made of multiply plastic films.

The above and further objects, features and advantages of this invention will become apparent to those familiar with the art from the following detailed description and specifications of a preferred embodiment of its concepts, illustrated in the accompanying drawings.

In the drawings:

Figure 1 is a perspective view of a typical tubular package or container constructed according to the concepts and features of this invention and demonstrating the mode of opening the same;

Figure 2 is an enlarged cross-sectional view taken substantially at line 2, 2 of Figure 1 and looking in the direction of the arrows thereon to show the details of the sealed joint and means employed for disrupting the package of Figure 1; and Figure 3 is an enlarged partial top plan view looking at the longitudinal seam or line of juncture employed in forming the tubular package of Figure 1 and illustrating, in particular, details of the disrupting mechanism employed therein.

Turning to the features of the invention, as illustrated in the accompanying drawings, it will be recognized from Figure 1, in particular, that a tubular package, indicated generally at 10, includes a lengthwise extending seam or joint 11 with the ends of the tubular package being closed or tied over opposite ends of the material contained therein, as at 12. A package of this character is suitable for packaging bulk items such as ice cream, ground meat, cheese, granular products, etc.

It will be seen from Figures 2 and 3, especially, that the seam 11 is constructed by overlapping edge portions 13 and 14 of an elongated rectangular section of a plastic packaging material and sealing the same together along joint or seam 11 by running the same between a stationary mandrel and a heated sealing wheel, for example. Other means of sealing the overlapping edge portions 13 and 14 may be carried out according to known practice, as gluing the layers together, for instance.

The material from which the sleeve or tubular package 10 is constructed preferably comprises a pair of superposed layers 15 and 16 forming a double wound film. More than two layers of the film material may be employed, if desired, but at least two are required for the success of this invention. The formation of such double wound films may be conducted according to the concepts and teachings outlined in the patents to Frederick A. Richter, No. 2,679,968 and No. 2,679,969, issued June 1, 1954. The film material used for such laminates comprises a member from the class or classes of plastic films which have a degree of self-affinity such that they will cohere when two films thereof are pressed one to the other under slight pressure as may be exerted by the human hand or when wound together under normal tension. A multi-ply laminate so formed, acquires an integral unitary character and the general appearance of a single layer film. Materials employed for such self-cohesive films include the classes listed in the above referred to patents, typical of which is polyvinylidene chloride, commercially known as saran. In any event the nature of the materials or films is such as to express the self-cohesive characteristic to bring forth the requisite self-adhesive quality necessary to produce the multi-ply laminates hereinabove specified.

It will be noticed that the lengthwise extending seal 11 between the edge portions 13 and 14 of the multi-ply is disposed inwardly of the lateral limit of the uppermost or superposed edge portion 14, as illustrated in Figure 2. This construction provides or permits the overlapping edge portion 14 to act as a tab mechanism capable of being gripped manually by the user, as shown in the perspective view of Figure 1 of the drawings.

It will be recalled that the major objective of this invention is to provide a means whereby a portion of the tubular package may be engaged and pulled so as to disrupt or open the package along a path or line substantially transverse to the longitudinal axis of the package. To successfully carry out this end, I provide one or more resist areas 20, at desired spaced intervals along the length of seam 11 and constituting a varnish, shellac or like media. Such varnished areas, as shown in Figure 2, are painted on edge portion 13 beneath the uppermost edge portion 14 of the tubular package so as to lie between the two superposed edge portions prior to the application of the means for effecting the lengthwise seal 11. The presence of the resist areas, while not preventing a fully sealed interconnection between the two superposed layers of film under the influence of the sealing means, nevertheless constitutes a built-in mechanism for weakening the seal between such two layers at designated areas defined, for example, by letters A, B, C and D as shown in Figure 3. In other words, the varnish areas between the superposed edge portions or layers of the multi-ply package forming film, set up localized areas of weakness in the seal 11.

Therefore, when the operator engages tab means provided by the uppermost flap or superposed edge portion 14 of the package opposite the varnished areas and pulls the same upwardly, according to the direction arrow U in Figures 1 and 2, disruption of the film takes place substantially in band form, the lateral limits of which are approximately defined by the lateral extent of the resist or varnished areas A, B, C and D so that the film will disrupt along lines or planes passing transversely or substantially transversely to the lengthwise axis of the tubular package, as indicated by the dotted lines T and T1 in Figures 1 and 3. The operator, of course, encircles the package with pulling motion thereby removing a complete band of the package material from the package, as desired. The end portion 21 of the package 10 outwardly of the first tear line T, for example, may be readily removed from the contents of the package such as frozen ice cream, by pulling the same axially. The provision of several of such resist areas 20 along the length of seam 11 provides a convenient means for disrupting the package at designated successive lengths or positions according to the consumption and use of the stored commodity, making the package highly convenient to use.

From the foregoing, it is believed that those familiar with the art will readily understand and appreciate the novel concept involved in my present invention, namely, that of providing a tubular plastic film package including a disrupting means capable of permitting tearing of the film from around the packaged contents along a path or pattern positioned substantially transversely of the lengthwise axis of the package. It is further to be understood that while I have herein described and related my invention to a particular form of package, nevertheless numerous changes, modifications and substitutions of equivalents may be applied therein without necessarily departing from the spirit and scope of my invention. For example, the package may take on a shape other than tubular and may comprise a packaging material composed of more than two laminated layers. Therefore, it is not my intention to be limited to the particular form of my invention herein disclosed and described other than as may appear in the following appended claims.

I claim:

1. A container of the class described, comprising, an elongated tube of multi-layer plastic film laminate, a lengthwise extending seal interjoining overlapping lateral edge portions of said film laminate, the outermost free edge portion of said film laminate beyond said seal providing a manually engageable tab means, and at least one area along the length of said seal which is weakened whereby outward pulling of said tab means opposite said weakened area and toward said seal results in dislodging a substantially rectangular band of said film material having substantially parallel side edges lying generally transverse to the longitudinal axis of said tube, the lateral width of said band being generally defined by the extent of said seam's weakened area.

2. A package of the class described, comprising, an elongated section of plastic material formed as a multi-layer film laminate, the film material being characterized by inherent self-cohesiveness under slight pressure, sealing means interjoining overlapping edge portions of said plastic laminate to form a tubular member having an uninterrupted seam extending lengthwise thereof, means sealing the ends of said tubular member after the introduction of material to be contained thereby, and means interposed between a portion of said overlapping edge portions for weakening the bonding effects of said sealing means during the formation of the seam thereby to provide a weakened area in said seam whereat said plastic material may be engaged and torn along substantially parallel paths lying substantially transverse to the longitudinal axis of said package.

3. A food package comprising an elongated tube of multi-layer plastic film laminate in which the film layers are inherently self-cohesive, means sealing over the ends of said tube after the introduction of the food product to be stored therewithin, an uninterrupted thermal seal formed lengthwise of said tube and interjoining overlapping edge portions thereof, and at least one area along the length of said thermal seal which is weakened by the introduction of a layer of bond resisting material intermediate said overlapping edge portions, the outermost free edge portion of said plastic material forming a tab member which may be manually engaged opposite said weakened area of said seal such that pulling of said tab member toward said seal serves to dislodge an encircling band of said plastic material having substantially parallel sides lying generally in planes transverse to the longitudinal axis of said package, said band's width being defined substantially by the lengthwise extent of said weakened area.

4. A container of the class described, comprising, an elongated tube of multi-layer plastic film laminate in which the layers are characterized by an inherent self-cohesiveness, a lengthwise extending seal interjoining overlapping edge portions of said film laminate, said seal being perfected by thermally welding said overlapping edge portions together, at least one area of varnish disposed along the length of said seal and intermediate said overlapping edge portions, the presence of said varnish serving to weaken the bond of said seal at said varnished area, the outer free edge portion of said plastic material beyond said seal providing a manually engageable tab means which may be pulled toward said seal opposite said varnished area to disrupt said plastic material along substantially parallel paths encircling said container and lying substantially transverse to the longitudinal axis thereof.

5. A container of the class described, comprising an elongated tube of multi-layer plastic film, a lengthwise extending seal interjoining overlapping lateral edge portions of said film, the outermost free edge portion of said film beyond said seal providing a manually engageable tab means, and at least one area along the length of said seal which is weakened during its formation by an interposed layer of varnish whereby outward pulling of said tab means at a point opposite said weakened area and toward said seal serves to dislodge a substantially annular band of said film extending around the girth of said container.

References Cited in the file of this patent

UNITED STATES PATENTS

| | | |
|---|---|---|
| 2,122,480 | Lowey | July 5, 1938 |
| 2,154,475 | Shearer | Apr. 18, 1939 |
| 2,213,758 | Eichberg et al. | Sept. 3, 1940 |
| 2,308,197 | Meyer | Jan. 12, 1943 |
| 2,360,597 | Topoiski | Oct. 17, 1944 |
| 2,563,316 | De Sylva | Aug. 7, 1951 |